US010543427B2

(12) United States Patent
Miller (10) Patent No.: US 10,543,427 B2
(45) Date of Patent: Jan. 28, 2020

(54) GAME CONTROLLER FUNCTION REMAPPING VIA EXTERNAL ACCESSORY (71) Applicant: Microsoft Technology Licensing, LLC, Redmond, WA (US)

(72) Inventor: Joshua O. Miller, Woodinville, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 9 days.

(21) Appl. No.: 15/005,696

(22) Filed: Jan. 25, 2016

(65) Prior Publication Data

US 2016/0317925 A1    Nov. 3, 2016

Related U.S. Application Data (60) Provisional application No. 62/154,596, filed on Apr. 29, 2015.

(51) Int. Cl.
A63F 13/42    (2014.01)
A63F 13/22    (2014.01)
A63F 13/98    (2014.01)

(52) U.S. Cl.
CPC ................... *A63F 13/42* (2014.09)

(58) Field of Classification Search
CPC ........... A63F 13/42; A63F 13/22; A63F 13/98
See application file for complete search history.

(56) References Cited

U.S. PATENT DOCUMENTS

| 4,976,435 | A | 12/1990 | Shatford et al. |
| 5,883,690 | A | 3/1999 | Meyers et al. |
| 5,896,125 | A | 4/1999 | Niedzwiecki |
| 5,903,259 | A | 5/1999 | Brusky et al. |
| 6,512,511 | B2 | 1/2003 | Willner et al. |
| 6,565,438 | B2 | 5/2003 | Ogino |
| 6,722,984 | B1 | 4/2004 | Sweeney et al. |
| 6,811,491 | B1 | 11/2004 | Levenberg et al. |
| 8,821,284 | B2 | 9/2014 | Jennings et al. |
| 2002/0039922 | A1 | 4/2002 | Nelson |
| 2003/0003993 | A1 | 1/2003 | Leifer et al. |

(Continued)

FOREIGN PATENT DOCUMENTS

WO    2014187923 A1    11/2014

OTHER PUBLICATIONS

"Set up and use the Xbox 360 Chatpad", Published on: Apr. 25, 2013, Available at: http://support.xbox.com/en-US/xbox-360/accessories/set-up-chatpad.

(Continued)

*Primary Examiner* — William H McCulloch, Jr.
*Assistant Examiner* — Yingchuan Zhang
(74) *Attorney, Agent, or Firm* — Alleman Hall Creasman & Tuttle LLP (57) ABSTRACT A game controller includes a plurality of controls, an accessory interface configured to removably affix an external accessory to the game controller, and a control mapping machine. The control mapping machine is configured to map a control of the plurality of controls to a first function while the external accessory is not affixed to the game controller, and map the control to a second function different than the first function while the external accessory is removably affixed to the game controller.

16 Claims, 6 Drawing Sheets (56) References Cited

U.S. PATENT DOCUMENTS

| | | |
|---|---|---|
| 2003/0027633 A1 | 2/2003 | Hames |
| 2005/0176504 A1 | 8/2005 | Stanley |
| 2006/0250351 A1* | 11/2006 | Fu .......................... A63F 13/06 |
| | | 345/156 |
| 2006/0258458 A1 | 11/2006 | Addington et al. |
| 2010/0267454 A1 | 10/2010 | Navid |
| 2011/0021269 A1* | 1/2011 | Wolff-Peterson ....... A63F 13/10 |
| | | 463/29 |
| 2012/0252584 A1* | 10/2012 | Mitchell ................. A63F 13/98 |
| | | 463/47 |

OTHER PUBLICATIONS

ISA European Patent Office, International Search Report and Written Opinion Issued in PCT Application No. PCT/US2016/026090, dated Jun. 2, 2016, WIPO, 11 pages.

IPEA European Patent Office, International Preliminary Report on Patentability Issued in PCT Application No. PCT/US2016/026090, dated Dec. 9, 2016, WIPO, 6 Pages.

"Notice of Allowance Issued in European Patent Application No. 16716432.6", dated Mar. 13, 2019, 7 pages.

* cited by examiner

GAME CONTROLLER FUNCTION REMAPPING VIA EXTERNAL ACCESSORY

CROSS REFERENCE TO RELATED APPLICATIONS

This application claims priority to U.S. Provisional Patent Application No. 62/154,596, filed on Apr. 29, 2015, the entirety of which is hereby incorporated herein by reference.

BACKGROUND

Game controllers may be designed ergonomically to be held with two hands For example, the game controller may be compact and lightweight such that the game controller may be held in a comfortable manner for an extended period of time. Moreover, controls may be laid out on the game controller in a manner that facilitates straightforward interaction. For example, buttons on the controller may be spaced apart a distance that allows a selected button to be pressed without accidently pressing an adjacent button.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A game controller includes a plurality of controls, an accessory interface configured to removably affix an external accessory to the game controller, and a control mapping machine. The control mapping machine is configured to map a control of the plurality of controls to a first function while the external accessory is not affixed to the game controller, and map the control to a second function different than the first function while the external accessory is removably affixed to the game controller.

DETAILED DESCRIPTION

Due to design goals of being compact, lightweight, and comfortable to hold, the number of controls (e.g., buttons, triggers, directional pads, bumpers, control sticks, switches, and touch sensors) provided on a game controller may be limited. Correspondingly, the functionality of the game controller may be limited to the number of controls. For example, each control may have a one-to-one mapping with a corresponding function.

However, there may be some scenarios where it may be desirable for the game controller to provide additional functionality. In one example, to provide such additional functionality, the game controller can be redesigned with additional controls that can be mapped to additional functions. However, a development cycle to redesign the game control would be costly, long, and may require many development resources. Moreover, such a redesign would detract from the initial design goals of the game controller. For example, shoehorning additional controls into the existing controller design may produce an overly crowded control layout that is difficult to interact with accurately.

The present disclosure is directed to a game controller configured to map at least one control to a first function when an external accessory is not affixed to the game controller. Further, the game controller may be configured to map the at least one control to a second function different than the first function when an external accessory is affixed to the game controller.

In some implementations, the game controller may be configured to automatically remap the at least one control from the first function to the second function responsive to detection of the external accessory being affixed to the game controller. In other words, the presence of the external accessory triggers remapping of the at least one control.

In some implementations, the game controller may be configured to selectively remap the at least one control from the first function to the second function while the external accessory is affixed to the game controller. In one example, the external accessory may be configured to operate in different states or modes. For example, the external accessory may include a control that toggles the external accessory between different states or modes. The game controller may be configured to detect a state or mode of the external accessory when the external accessory is affixed to the game controller. Further, the game controller may be configured to map the at least one control to the first function while the external accessory is in a first state, and configured to map the at least one control to the second function while the external accessory is in the second state.

In one particular example of such an implementation, the external accessory may include a "function" button. Further, the game controller may be configured to change mapping of the at least one control responsive to actuation of the function button. In some implementations, while the external accessory is attached to the controller and the function button is depressed, existing controls on the game controller may be temporarily re-mapped/re-purposed to perform alternative functions while the function button remains depressed. In other implementations, each press of the function button may toggle between two or more different mappings, such that the controller will continue using a particular mapping until the function button is subsequently actuated.

In the above described implementations, the external accessory may be used to extend the functionality of the game controller quickly and cost effectively without having to redesign the game controller. Moreover, by using a combination of the controls on the external accessory and the existing controls on the game controller, the control layout on the game controller can be designed for ergonomics and comfort while selectively providing expanded functionality via the external accessory. While primarily described with relation to an external accessory, a function button may optionally be included as part of the base game controller. In some implementations, state toggling analogous to that provided by a function button or other hardware control may be implemented via speech recognition, gesture recognition, and/or other types of user input executed independently of control actuation on the game controller or external accessory.

Figure 1:
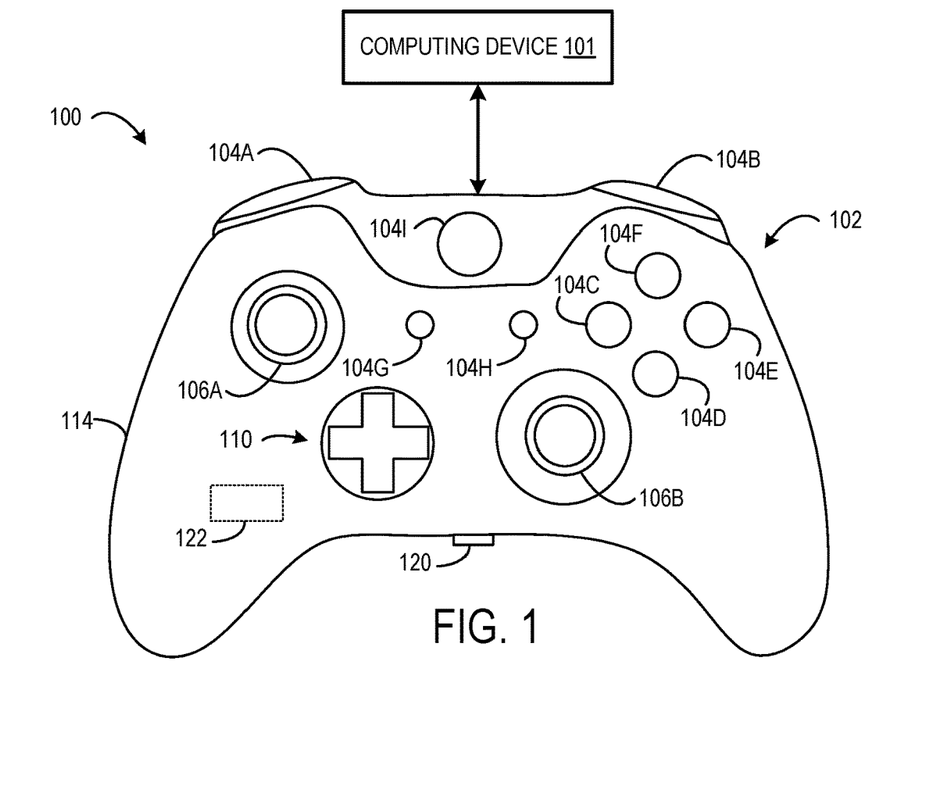
FIG. 1 shows a front of an example game controller.
Figure 2:
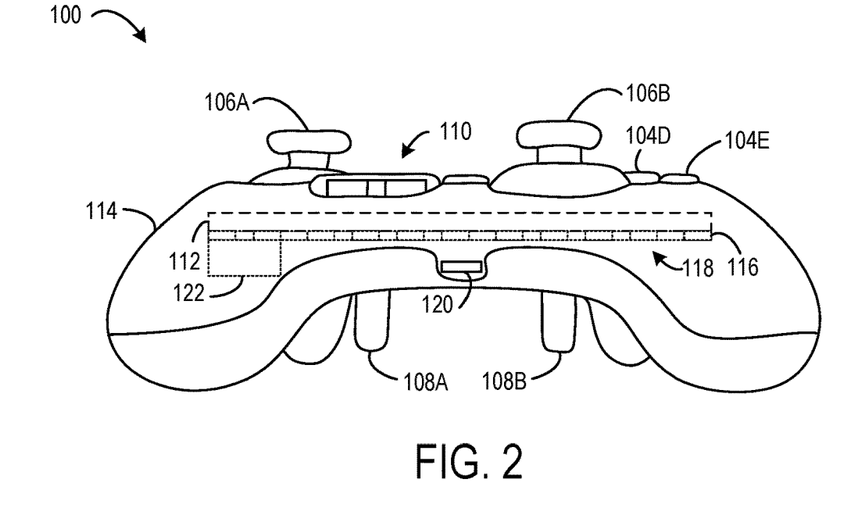
FIG. 2 shows a bottom of the game controller of FIG. 1

FIGS. 1 and 2 show an example game controller 100. The game controller 100 may be configured to translate user input into control signals that are provided to a computing device 101, such as a gaming console. The control signals may be mapped to commands to control a video game or perform other operations. For example, the game controller 100 may be configured to send control signals via a wired or wireless connection with the computing device 101. The computing device 101 and/or the game controller 100 may be configured to map different control signals to different commands based on settings of the computing device 101 and/or the game controller 100.

In some implementations, the game controller 100 may be configured to map (or remap) control signals to commands and send the commands to the computing device 101. In other words, the mapping of control signal to commands may be performed locally on-board the game controller 100.

The game controller 100 includes a plurality of controls 102 configured to generate different control signals responsive to finger manipulation. In particular, the plurality of controls 102 includes a plurality of action buttons 104 (e.g., 104A, 104B, 104C, 104D, 104E, 104F, 104G, 104H, and 104I), a plurality of joysticks 106 (e.g., a left joystick 106A and a right joystick 106B), a plurality of triggers 108 (e.g., a left trigger 108A and a right trigger 108B), and a directional pad 110. The game controller 100 may include any number of controls, any type of controls, any number of electronic input sensors, and any type of electronic input sensors without departing from the scope of this disclosure.

The plurality of controls 102 may be coupled to one or more frames 112. The frame 112 may be contained in a housing 114 of the game controller 100. One or more printed circuit boards 116 may be coupled to the frame 112. The printed circuit board 116 may include a plurality of electronic input sensors 118. Each electronic input sensor 118 may be configured to generate an activate control signal responsive to interaction with a corresponding control 102. Non-limiting examples of electronic input sensors may include dome switches, tactile switches, Hall Effect sensors, potentiometers, and other electronic sensing components. Any suitable sensor may be implemented in the game controller 100. In some implementations, two or more printed circuit boards may be used.

Each of the action buttons 104 may be configured to activate a corresponding electronic input sensor 118 to generate an activate control signal responsive to being depressed (e.g., via finger manipulation). Each of the joysticks 106 may be configured to provide two-dimensional input that is based on a position of the joystick in relation to a default "center" position. For example, the joysticks may interact with electronic input sensors in the form of potentiometers that use continuous electrical activity to provide an analog input control signal. Each of the triggers 108 may be configured to provide a variable control signal based on a position of the trigger relative to a default position. For example, as a trigger is pulled farther away from the default position a characteristic of the generated control signal may increase in magnitude.

The directional pad 110 may be configured to reside in a default posture when no touch force is applied to the directional pad 110. In the default posture, the directional pad 110 does not cause any of the plurality of electronic input sensors 128 to generate an activate control signal indicative of touch input. Further, the directional pad 110 may be configured to move from the default posture to a selected activation posture responsive to a touch force being applied to the directional pad 110. The selected activation posture may be one of a plurality of different activation postures that each generate a different activate control signal or combination of activate control signals by interfacing with different electronic input sensors.

Note that an activation signal produced by an electronic input sensor 118 when a corresponding control 102 is in an activation posture may be any signal that differs from a signal or lack thereof produced by the electronic input sensor 118 in the default posture. For example, in some implementations, the activation signal may correspond to a supply voltage (e.g., VDD) of the game controller 100 and the signal produced in the default state may correspond to a relative ground. (e.g., 0). In other implementations, the activation signal may correspond to a relative ground and the signal produced in the default state may correspond to the supply voltage of the game controller 100.

In the depicted implementation, the directional pad 110 is depressable in four different directions (e.g., up, down, left, and right) to interface with different electronic input sensors that generate different activate control signals. In some implementations, the four different directions may correspond to four different activation postures that generate four different activate control signals to provide four-way directional input. In some implementations, combinations of activate control signals corresponding to pressing the directional pad 110 in two directions (e.g., up and left) at one time may be interpreted as additional activation postures corresponding to diagonals in between the four directions to provide eight-way directional input. In some implementations, the directional pad 110 may include a number of directions different than four or eight. For example, the directional pad 110 may include two or more different directions.

The game controller 100 includes an accessory interface 120 configured to removably affix an external accessory to the game controller 100. In particular, the accessory interface 120 may be configured to electronically and/or mechanically connect an external accessory to the game controller 100. As such, the accessory interface may include one or more electrically-conductive contacts that align with complimentary electrically-conductive contact(s) of the external accessory to facilitate one-way and/or two-way communication signals to pass between the game controller 100 and the external accessory. Power may also be delivered via complimentary electrically-conductive contacts. Further, the accessory interface may include one or more orifices sized and shaped to mechanically mate with complimentary extension(s) of an external accessory, and/or the accessory interface may include one or more extensions sized and shaped to mechanically mate with complimentary orifice(s) of an external accessory. The electrically conductive contacts, when included, may be located on the orifices and/or extensions of the accessory interface. The accessory interface 120 may provide a mounting platform with which an external accessory may align to affix the external accessory to the game controller 100. In some implementations, the accessory interface 120 may enable the game controller 100 to provide power to an external accessory affixed to the game controller 100 or vice versa via aligned electrically-conductive contacts. The accessory interface 120 may enable one-way or two-way communication between the game controller 100 and an external accessory affixed to the game controller 100 via aligned electrically-conductive contacts. In one example, the accessory interface 120 may include a universal serial bus (USB) port to enable two-way communication between the external accessory and the game controller 100. The accessory interface 120 may take any suitable form.

The game controller 100 includes a control mapping machine 122 configured to map control signals generated from different controls of the game controller 100 to different commands or functions based on different operating conditions. Control mapping machine 122 may map any suitable control of the game controller to any suitable function based on any suitable operating condition. Moreover, control mapping machine 122 may re-map any suitable control from a first function to a second function different than the first function responsive to any suitable change in operating conditions. As used herein, "machine" means physical data-storage and processing hardware programed with instructions to perform specialized computing operations. It is to be understood that two or more different machines may share hardware components. For example, the same integrated circuit may be part of two or more different machines.

In some implementations, the control mapping machine 122 may be at least partially virtualized and at least partially implemented in the computing device 101. In such implementations, the game controller 100 may send control signals corresponding to the different controls of the game controller 100 and/or operating state information of the game controller 100, such as an indication whether or not an external assessor is affixed to the game controller 100. Further, the virtualized control mapping machine 122 at least partially implemented on the computing device 101 may map the control signals to different commands based on the operating state of the game controller 100.

Figure 3:
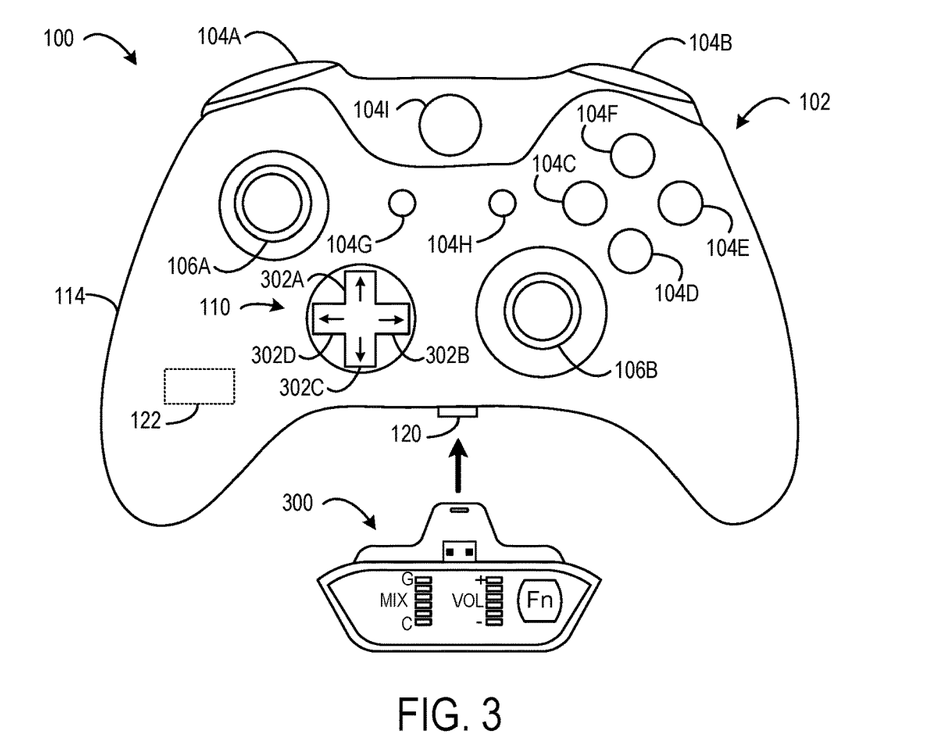
FIG. 3 shows the game controller of FIG. 1 and an external accessory ready to be affixed to the game controller.

Various example control mapping scenarios related to attachment of an external accessory to the game controller 100 are described below. FIG. 3 shows the game controller 100 without an external accessory 300 affixed to the game controller 100. In a state where no external accessory is affixed to the game controller 100, the control mapping machine 122 may map the control signals corresponding to the plurality of controls 102 to a first (e.g., default) set of commands also referred to as a first function scheme. Note that the first set of commands may include different subsets of commands that change based on a state of a computing device (e.g., game console) to which the game controller 100 is providing the control signals.

In one example, while a video game is being executed by a game console, the control signals corresponding to the plurality of controls 102 may be mapped to a first subset of commands that are specific to that video game. In another example, while the game console is presenting a platform-level dashboard, the control signals corresponding to the plurality of controls 102 may be mapped to a second subset of commands that are applicable to platform-level operations. In both examples, the subsets of commands are part of a larger set of default commands or a default function scheme that is mapped to the controls signals corresponding to the plurality of controls 102 while no external accessory is affixed to the game controller 100.

While no external accessory is affixed to the game controller 100, functionality provided by the game controller 100 may be limited to the set of default commands mapped to the control signals corresponding to the plurality of controls 102. In some implementations, the default functionality can be changed, but doing so may involve time-consuming processes for changing device/system/game settings. Accordingly, an external accessory (e.g., the external accessory 300) may be affixed to the game controller 100 to quickly and easily provide additional functionality.

In some implementations, an external accessory may include at least one control that corresponds to an additional control signal. The additional control signals may be sent to the game console (e.g., directly from the external accessory or passed through the game controller 100), and the control mapping machine 122 may map the control signals to additional commands that are not included in the set of default commands corresponding to the plurality of controls 102 of the game controller 100.

In some implementations, affixing an external accessory to the game controller 100 may cause the game controller 100 to send different control signals responsive to activation of a control. In other words, activation of a particular control will cause the game controller 100 to send one control signal when the external accessory is not affixed, and send a different control signal when the external accessory is affixed. In some implementations, the same control signal may be sent, but in cooperation with another control signal indicating accessory functionality is to be implemented such that the computing device 101 interprets the control signal differently.

In some implementations, activating a function button may cause the game controller 100 to send different control signals responsive to activation of a control. In other words, activation of a particular function control will cause the game controller 100 to send one control signal prior to activation of the function control, and send a different control signal after activation of the function control.

As one example, selective remapping is described with reference to the directional pad 110. Note that the herein described remapping may be broadly applicable to any of the plurality of controls 102 based on an external accessory being affixed to the game controller 100 and/or a function button being activated.

In the depicted implementation, the directional pad 110 includes a plurality of branches 302 (e.g., up branch 302A, right branch 302B, down branch 302C, left branch 302D). In a default mapping, each branch may correspond to a different default command. For example, the four default commands may be four cardinal navigation commands (e.g., up, right, down, left) that are mapped to the four different branches 302. In one example, the four cardinal navigation commands may be used to move an avatar (or other virtual object) in a virtual world of a video game being executed by a game console. In another example, the four cardinal navigation commands may be used to navigate between different menus, menu items, tabs, locations, or other objects in a platform-level dashboard of a game console.

Figure 4:
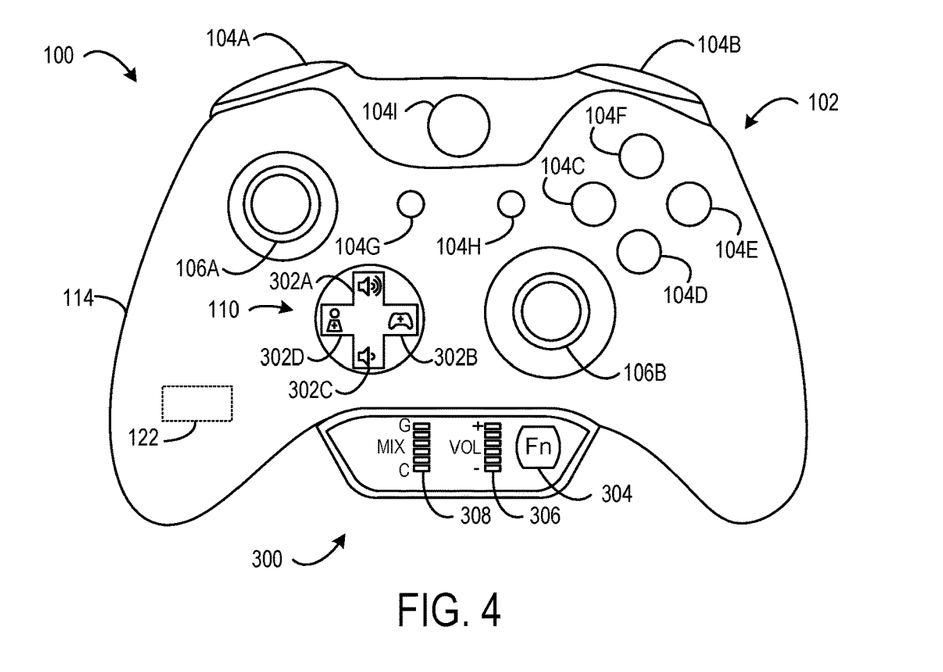
FIG. 4 shows an external accessory affixed to the game controller of FIG. 1.

In this example implementation, none of the default commands include audio commands. For example, audio commands may include commands to adjust an audio device (e.g., headphones, speakers, sound bar, or another audio device) in communication with the computing device 101. Accordingly, as shown in FIG. 4, the external accessory 300 may be affixed to the game controller 100 to expand the functionality of the game controller 100 to include audio commands. In other words, while the external accessory 300 is affixed to the game controller 100, the control mapping machine 122 may remap one or more controls of the game controller 100 from a first (e.g. default) function scheme to a second function scheme that is different from the first function scheme. Note that the different function scheme may include mappings of one or more controls of the game controller 100.

In one example, the external accessory 300 includes a function button 304 that when depressed causes the different branches of the directional pad 110 to be remapped from the default cardinal navigation commands to audio commands. In other words, while the external accessory 300 is affixed to the game controller 100, the function button 304 may be depressed to selectively, temporarily remap the control signals corresponding to the different branches 304 of the directional pad 110.

In the depicted implementation, the audio controls may include controls for adjusting a volume level, as well as controls for adjusting a chat/game volume ratio, which is a blend of sound produced by a video game and chat communications. In particular, when the function button 304 is depressed, the control mapping machine 122 maps the up branch 302A of the directional pad 110 to an increase game volume command. When the function button 304 is depressed, the control mapping machine 122 maps the down branch 302C of the directional pad 110 to a decrease game volume command. Further, when the function button 304 is depressed, the control mapping machine 122 maps the right branch 302B of the directional pad 110 to a command to increase a game volume relative to a chat volume of a chat/game audio mix. When the function button 304 is depressed, the control mapping machine 122 maps the left branch 302D of the directional pad 110 to a command to increase the chat volute relative to the game volume in the chat/game audio mix.

Note that in FIGS. 3-6 the iconography on the directional pad 110 is depicted for ease of understanding, and such iconography may not actually be present on the directional pad 110. Although, in some implementations, the directional pad 110 may be configured to selectively present such iconography (e.g., via active lighting and/or mini display). Further, the directional pad 110 may be configured to dynamically change presented iconography to reflect the current mapping of the directional pad 110.

In some implementations, various approaches may be implemented to support educating a user on such remapped functionality. In one example, in implementations where the directional pad 110 is replaceable, the replacement part may include iconography to help indicate to the user the alternatively mapped functionality. In another example, a printed overlay (e.g., paper, sticker) may be temporarily affixed around or on the directional pad 110 to provide remapped iconography. In another implementation, an image of the game controller with iconography or other instructions may be temporarily displayed (e.g., via an overlay) on a video game or other displayed content.

Furthermore, the external accessory 300 may include indicators that provide positive feedback to indicate that remapped functionality is being performed. In particular, the external accessory 300 includes a volume level feedback indicator 304 and a chat/game audio mix feedback indicator 306. For example, the indicators 304 and 306 may include LED arrays that indicate the volume level or chat/game mix levels as they are changed in real time. Note that the external accessory 300 may include any positive feedback indicator. In one example, such feedback indicators may be auditory indicators instead of visual indicators.

An external accessory may be affixed to the game controller 100 in any suitable manner. In one example, the accessory interface 120 includes a communication port (e.g., a USB port) configured to selectively mate with any external accessory that includes a cooperating communication plug. An external accessory and/or the game controller 100 may include any suitable mating components that allow for the external accessory to be affixed to the game controller. Non-limiting examples of mating elements may include magnets, mechanical fasteners, aligned electrical contacts, and other mating structures.

Figure 5:
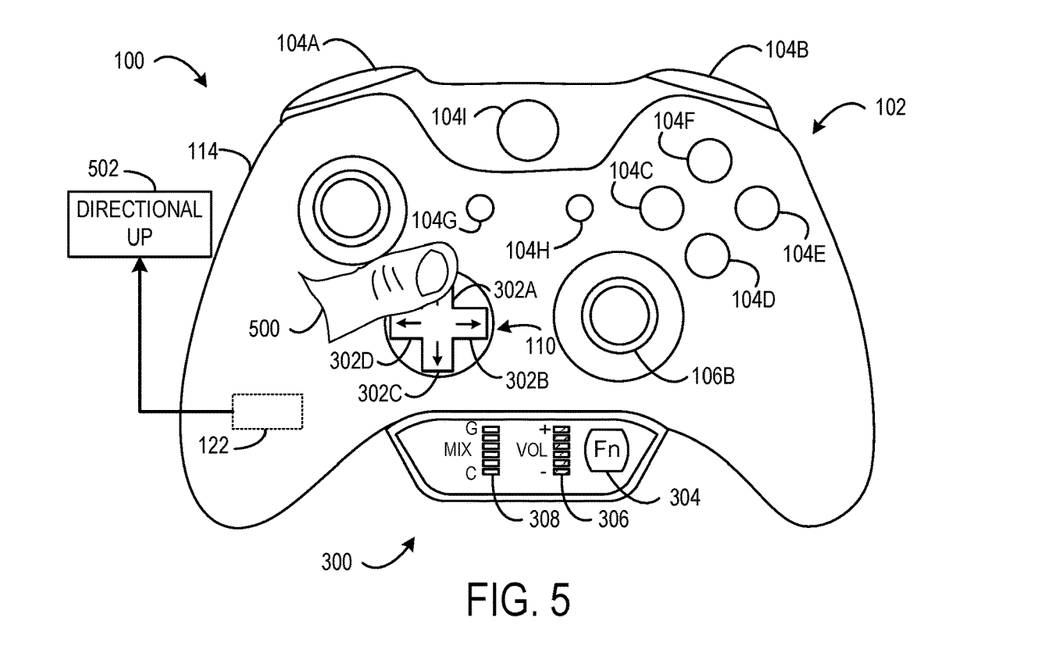
FIG. 5 shows an example scenario where a directional pad of the game controller of FIG. 1 is mapped to a first set of functions.

As discussed above, the external accessory 300 may allow for selective, temporary remapping of the directional pad 110 on demand as desired by the user. In one example, as shown in FIG. 5, while the external accessory 300 is affixed to the game controller 100, a user may press the up branch 302A of the directional pad 110 with a left thumb 500. In this case, the function button 304 is not depressed, so the control mapping machine 122 maps the up branch 302A to a default command in the form of a "DIRECTIONAL UP" control signal 502. In other words, the user may choose to not remap the functionality of the directional pad 110 even though the external accessory 300 is affixed to the game controller 100.

Figure 6:
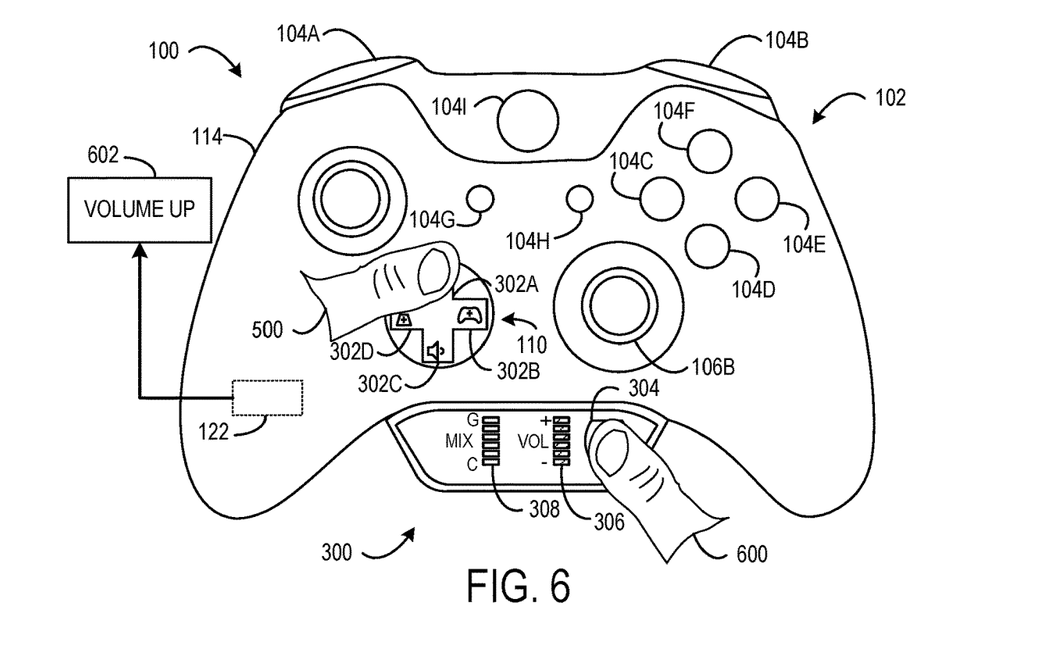
FIG. 6 shows an example scenario where the directional pad of the game controller of FIG. 1 is mapped to a second set of functions.

In another example, as shown in FIG. 6, while the external accessory 300 is affixed to the game controller 100, a user may press the up branch 302A with a left thumb 500. At the same time, the user may press the function button 304 with a right thumb 600. In this case, because the function button 304 is depressed, the control mapping machine 122 maps the up branch 302A to a remapped command in the form of a "VOLUME UP" control signal 602. Correspondingly, the LEDs of the volume level feedback indicator 306 are lit to show the increase in volume level. In other words, the user is able to adjust the functionality of the directional pad 110 on the fly as desired while the external accessory 300 is affixed to the game controller 100. Further, the user is provided with positive feedback when alternative functionality is performed.

In some implementations, the computing device 101 may receive a signal indicating the state of the function button 304. In one example, the external accessory 300 may send a control signal to the game controller 100 responsive to the function button 304 being depressed. Further, the game controller 100 may pass the control signal on to the computing device 101. In another example, the external accessory 300 may send a control signal directly to the computing device 101 responsive to the function button 304 being depressed. In another example, in response to the function button 304 being depressed while one of the plurality of controls 102 is activated (e.g., a direction of the directional pad 110 is depressed), the game controller 100 and/or the external accessory 300 may send a control signal that corresponds to the combination of the two controls to the computing device 101.

In some implementations, while the external accessory 300 is affixed to the game controller 100, the computing device 101 (shown in FIG. 1) may receive a notification that the external accessory 300 is affixed to the game controller 100. For example, the game controller 100 may recognized that the external accessory 300 is affixed to the game controller 100, and send a notification (e.g., a control signal) to the computing device 101. In one example, the game controller 100 may detect a presence of the external accessory 300 (e.g., via a signal received from the external accessory), and in response to detecting the external accessory 300, send a notification (e.g., control signal) to the computing device 101. In another example, in response to the external accessory 300 being affixed to the game controller 100, the external accessory 300 may send a notification (e.g., control signal) directly to the computing device 101.

Figure 7:
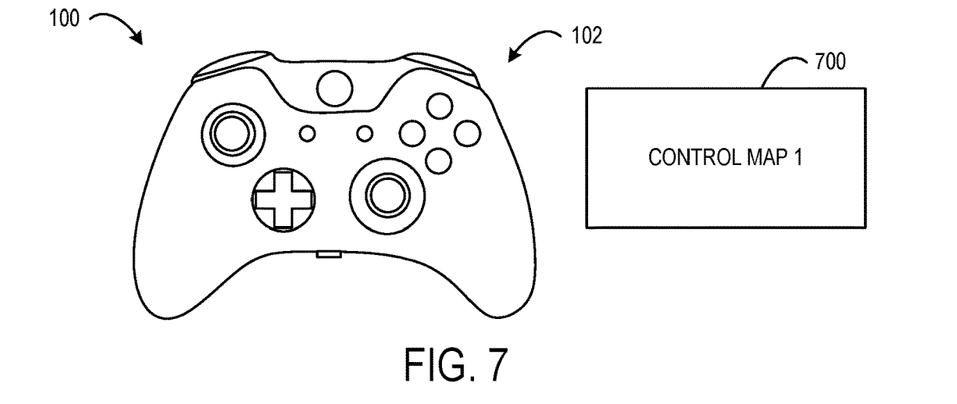
FIGS. 7-9 show different function maps applied to the game controller of FIG. 1 based on different external accessories affixed to the game controller.
Figure 8:
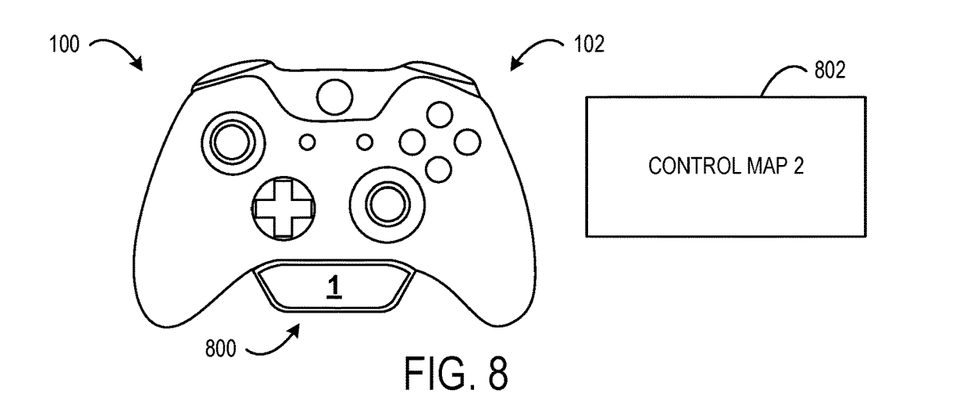
Figure 9:
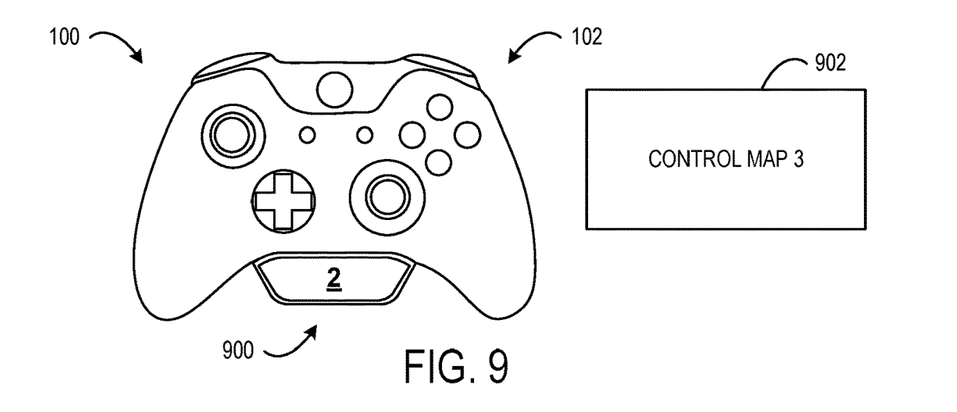

In some implementations, instead of allowing for selective remapping of functionality while an external accessory is affixed to the game controller 100, the computing device 101 may be configured to automatically remap functionality of the game controller 100 responsive to an external accessory being affixed to the game controller 100. In some such implementations, the above described notifications may be used to trigger the remapping of functionality In some implementations, differently configured external accessories may cause different mappings of different function schemes to be applied to the game controller 100. FIGS. 7-9 show one example scenario where different control maps or function schemes are applied to the game controller 100 based on differently configured external accessories being affixed to the game controller 100. In particular, in FIG. 7, no external accessory is affixed to the game controller 100, and the plurality of controls 102 is mapped to a first (e.g., default) control map 700 (or first function scheme) that provides default functionality of the game controller 100. The first control map 700 may include a mapping of each of the plurality of controls 102 to a corresponding function.

In FIG. 8, a first external accessory 800 is affixed to the game controller 100, and the plurality of controls 102 are mapped to a second control map 802 (or second function scheme) having different functionality than the first control map 700. For example, one or more or the plurality of controls 102 may be mapped to a different function in the second control map 802 relative to the first control map 700. In some implementations, each control of the plurality of controls 102 may be remapped to a different function.

Figure 10:
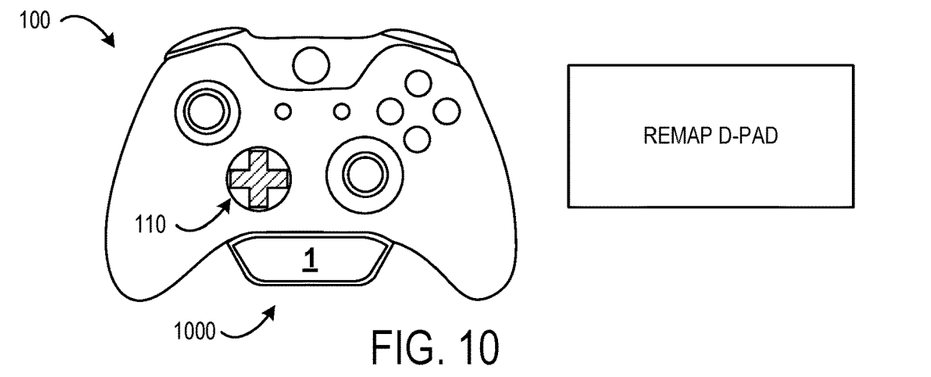
FIGS. 10-12 show different function maps applied to different subsets of controls of the game control of FIG. 1 based on different external accessories affixed to the game controller.
Figure 11:
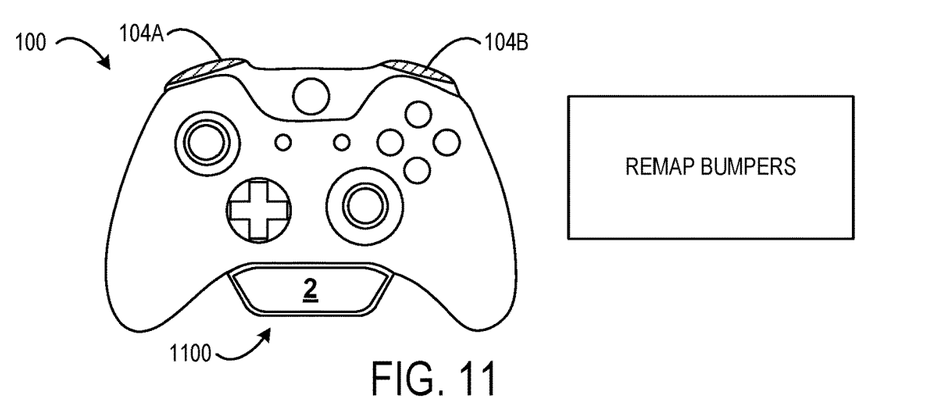
Figure 12:
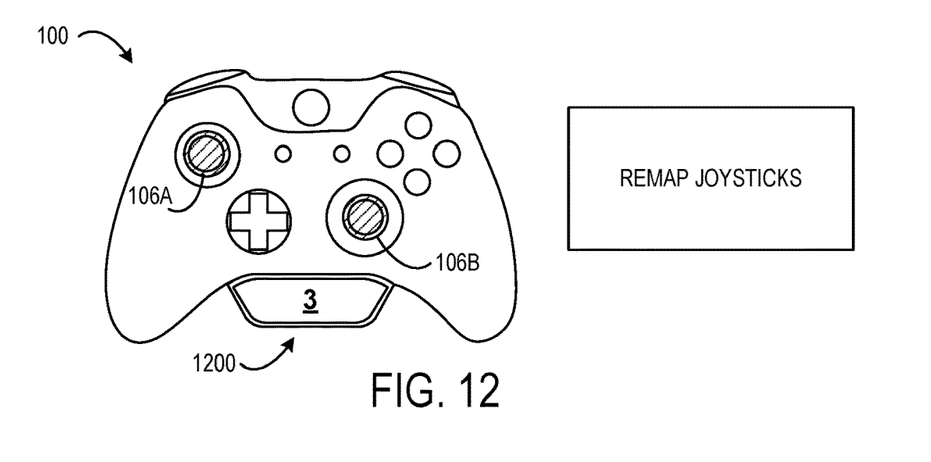

In FIG. 9, a second external accessory 900 is affixed to the game controller 100. The second external accessory 900 may be differently configured than the external accessory 800. For example, the external accessory 800 may provide expanded functionality related to audio commands, and the external accessory 900 may provide expanded functionality related to video commands (e.g., adjustment of display characteristics, 2D-3D adjustment, and adjustment of other video parameters). While the second external accessory 900 is affixed to the game controller 100, the plurality of controls 102 are mapped to a third control map 902 (or third function scheme) having different functionality than the first control map 700 and the second control map 802. Any suitable number of external accessories may cause a remapping of any or all of the plurality of controls 102 of the game controller 100 to any suitable functionality In some implementations, differently configured external accessories may cause different mappings to be applied to different controls of the game controller 100. FIGS. 10-12 show one example scenario where different controls are remapped based on differently configured external accessories being affixed to the game controller 100. In particular, in FIG. 10, a first external accessory 1000 is affixed to the game controller 100, which causes the directional pad 110 to be remapped from default functions to different functions. In this case, the presence of the first external accessory 1000 does not affect the mapping of the controls on the game controller 100 other than the directional pad 110.

In FIG. 11, a second external accessory 1100 that is differently configured than the first external accessory 1000 is affixed to the game controller 100. While the second external accessory 1100 is affixed to the game controller 100, the bumpers 104A and 104B may be remapped from default functions to different functions. In this case, the presence of the second external accessory 1100 does not affect the mapping of the controls on the game controller 100 other than the bumpers 104A and 104B.

In FIG. 12, a third external accessory 1200 that is differently configured than the first external accessory 1000 and differently configured than the second external accessory 1200 is affixed to the game controller 100. While the third external accessory 1200 is affixed to the game controller 100, the joysticks 106A and 106B may be remapped from default functions to different functions. In this case, the presence of the third external accessory 1200 does not affect the mapping of the controls on the game controller 100 other than the joysticks 106A and 106B.

In some implementations a function control may be configured to toggle between two, three, or more different control maps or function schemes and/or to cause different mappings to be applied to different controls. In other words, a single external accessory with a function toggle control may provide the flexibility described with reference to FIGS. 7-12. The above described control maps may be applied selectively or automatically while an external accessory is affixed to the game controller 100 according to the approaches described above.

An external accessory may include any suitable component that is removably affixable to the game controller 100 and allows for at least one control of the game controller 100 to be mapped to a different function. Note that an external accessory may be configured in any suitable manner to provide any suitable functionality to the game controller 100.

Figure 13:
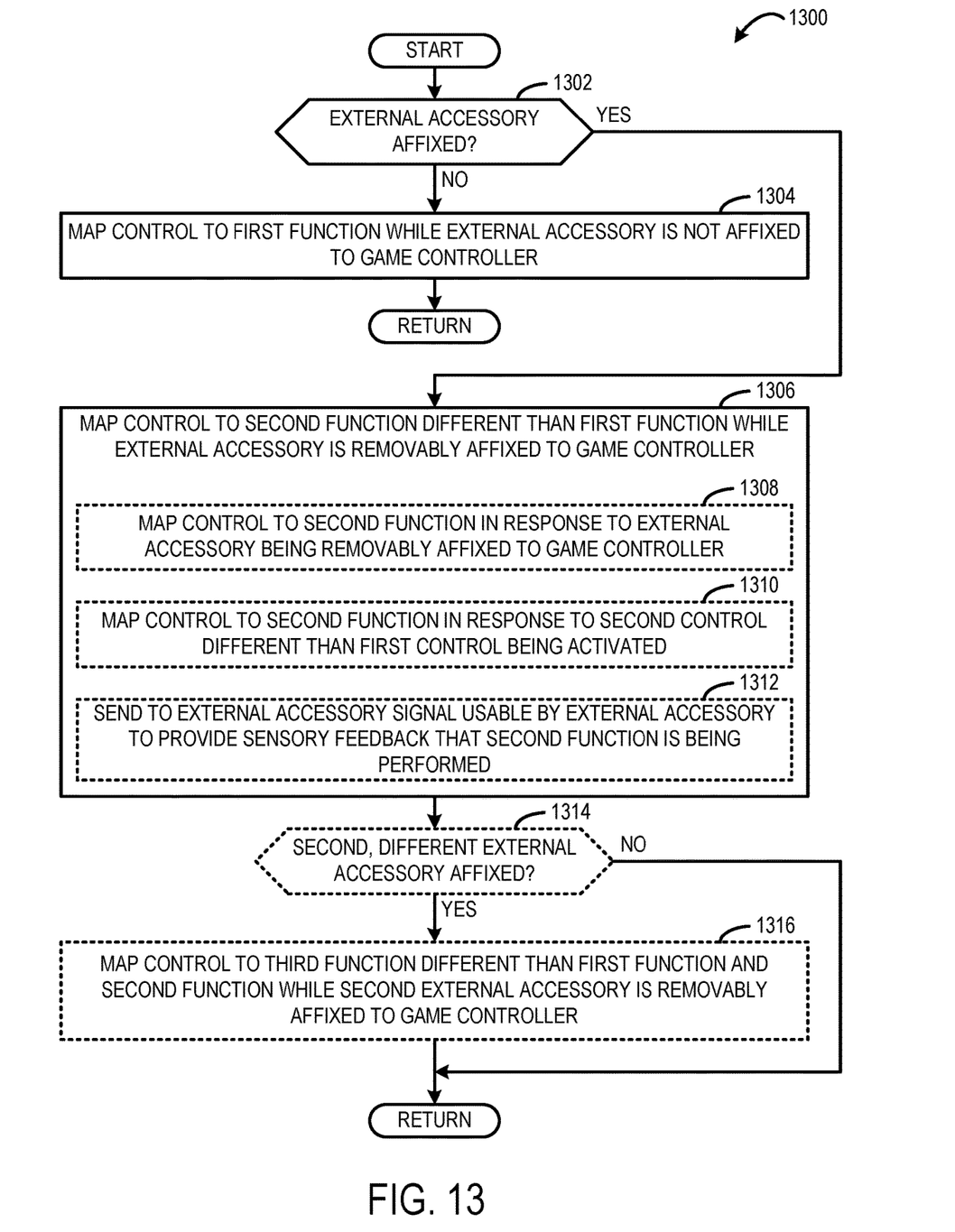
FIG. 13 shows an example method for controlling operation of a game controller.

FIG. 13 shows an example method 1300 for controlling operation of a game controller. In one example, the method 1300 is performed by the control mapping machine 122 of the game controller 100 shown in FIG. 1.

At 1302, the method 1300 includes recognizing whether an external accessory is affixed to the game controller. If no external accessory is affixed to the game controller then the method 1300 moves to 1304. Otherwise, an external accessory is affixed to the game controller, and the method 1300 moves to 1306.

At 1304, the method 1300 includes mapping a control of the game controller to a first function while the external accessory is not affixed to the game controller. For example, the first function may be a default function that is mapped to the control when no external accessory is affixed to the game controller.

At 1306, the method 1300 includes mapping the control to a second function different than the first function while the external accessory is removably affixed to the game controller.

In some implementations, at 1308, the method 1300 optionally may include mapping the control to the second function in response to the external accessory being removably affixed to the game controller.

In some implementations, at 1310, the method 1300 optionally may include mapping the control to the second function in response to a second control different than the first control being activated while the external accessory is affixed to the game controller. For example, the second control may act as a function button that is activated while the first control is activated to cause remapping of functionality of the first control. In one example, the second control is included on the external accessory removably affixed to the game controller. In another example, the second control is included on the game controller.

In some implementations, at 1312, the method 1300 optionally may include sending to the external accessory a signal useable by the external accessory to provide sensory feedback that the second function is being performed. For example, signal may be sent responsive to activation of the control. In one example, the external accessory provides visual feedback, such as activating a light. In another example, the external accessory provides haptic feedback, such as activating a vibration motor.

In some implementations, the game controller may include an accessory interface that is configured to interchangeably affix a plurality of differently configured external accessories to the game controller. In some such implementations, at 1314, the method 1300 optionally may include recognizing whether a second, different external accessory is removably affixed to the game controller. If the second, different external accessory is removably affixed to the game controller, then the method 1300 moves to 1316. Otherwise, the method 1300 returns to other operations.

In some such implementations, at 1316, the method 1300 optionally may include mapping the control to a third function different than the first function and the second function while the second, different external accessory is removably affixed to the game controller.

The above described method may be performed to control operation of a game controller in a manner that allows functionality of the game controller to be extended, via the external accessory, quickly and cost effectively without having to redesign the game controller. Moreover, by using a combination of the controls on the external accessory and the existing controls on the game controller, the control layout on the game controller can be designed for ergonomics and comfort while selectively providing expanded functionality via the external accessory.

Additional aspects of the present disclosure are described below. According to one aspect, a game controller comprises a plurality of controls, an accessory interface configured to removably affix an external accessory to the game controller, and a control mapping machine configured to map a control of the plurality of controls to a first function while the external accessory is not affixed to the game controller, and map the control to a second function different than the first function while the external accessory is removably affixed to the game controller. In this aspect, the control may be a first control, and the control mapping machine may be configured to map the control to the second function in response to a second control different than the first control being activated while the external accessory is removably affixed to the game controller. In this aspect, the second control may be included on the external accessory removably affixed to the game controller. In this aspect, the control mapping machine may be configured to toggle between two or more different mappings responsive to a toggling of a function control of the external accessory. In this aspect, the control mapping machine may be configured to map the control to the second function in response to the external accessory being removably affixed to the game controller. In this aspect, the control mapping machine may be configured to send to the external accessory a signal useable by the external accessory to provide sensory feedback that the second function is being performed. In this aspect, the accessory interface may be configured to interchangeably affix a plurality of differently configured external accessories to the game controller. In this aspect, the control mapping machine may be configured to map the control to a first-external-accessory function while a first external accessory is removably affixed to the game controller, and the control mapping machine may be configured to map the control to a second-external-accessory function, different than the first-external-accessory function, while a second, different external accessory is removably affixed to the game controller. In this aspect, the control mapping machine may be configured to selectively change the mappings of different ones of the plurality of controls based on which of the plurality of differently configured external accessories is removably affixed to the game controller.

According to another aspect, a method for controlling operation of a game controller, comprises recognizing that no external accessory is affixed to the game controller, mapping a control of the game controller to a first function while no external accessory is affixed to the game controller, recognizing that an external accessory is removably affixed to the game controller, and mapping the control to a second function different than the first function while the external accessory is removably affixed to the game controller. In this aspect, the control may be a first control, and the method may further comprise mapping the control to the second function in response to a second control different than the first control being activated while the external accessory is removably affixed to the game controller. In this aspect, the second control may be included on the external accessory removably affixed to the game controller. In this aspect, the method may further comprise toggling between two or more different mappings responsive to a toggling of a function control of the external accessory. In this aspect, mapping may include mapping the control to the second function in response to the external accessory being removably affixed to the game controller. In this aspect, the method may further comprise sending to the external accessory a signal useable by the external accessory to provide sensory feedback that the second function is being performed. In this aspect, the accessory interface may be configured to interchangeably affix a plurality of differently configured external accessories to the game controller. In this aspect, the method may further comprise mapping the control to a first-external-accessory function while a first external accessory is removably affixed to the game controller, and mapping the control to a second-external-accessory function, different than the first-external-accessory function, while a second, different external accessory is removably affixed to the game controller.

According to another aspect, a game controller comprises a plurality of controls, an accessory interface configured to interchangeably affix a plurality of differently configured external accessories to the game controller, and a control mapping machine configured to map the plurality of controls to a first function scheme while no external accessory is affixed to the game controller, map the plurality of controls to a second function scheme different than the first function scheme while a first external accessory is removably affixed to the game controller, and map the plurality of controls to a third function scheme different than the first function scheme and the second function scheme while a second, different external accessory is removably affixed to the game controller. In this aspect, the first function scheme may map a first control of the plurality of controls to a first function, the second function scheme may map the first control to a second function different than the first function, and the third function scheme may map the first control to a third function different than the first function and the second function. In this aspect, the control mapping machine may be configured to toggle between the first function scheme and the second function scheme responsive to a toggling of a function control of the first external accessory.

It will be understood that the configurations and/or approaches described herein are exemplary in nature, and that these specific implementations or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A game controller in communication with a computing device, the game controller comprising:
   a plurality of controls;
   an accessory interface configured to removably affix an external hardware accessory to the game controller, the external hardware accessory including an additional control; and
   a control mapping machine configured to:
      map a control of the plurality of controls to a first function while the external hardware accessory is not affixed to the game controller,
      send the first function from the game controller to the computing device based on the control being activated via user manipulation, while the external hardware accessory is not affixed to the game controller,
      map the control to a second function different than the first function while the external hardware accessory is removably affixed to the game controller, and
      send the second function from the game controller to the computing device based on the control being activated via user manipulation, while the external hardware accessory is removably affixed to the game controller and based on a signal received from the external hardware accessory responsive to user manipulation of the additional control.

2. The game controller of claim 1, wherein the control mapping machine is configured to toggle between two or more different mappings responsive to a toggling of the additional control of the external hardware accessory.

3. The game controller of claim 1, wherein the control mapping machine is configured to map the control to the second function based on both the control and the additional control being activated at a same time while the external hardware accessory is removably affixed to the game controller.

4. The game controller of claim 1, wherein the control mapping machine is configured to send to the external hardware accessory a feedback signal useable by the external hardware accessory to provide sensory feedback that the second function is being performed.

5. The game controller of claim 1, wherein the accessory interface is configured to interchangeably affix a plurality of differently configured external hardware accessories to the game controller.

6. The game controller of claim 5, wherein the external hardware accessory is a first external hardware accessory of the plurality of differently configured external hardware accessories, wherein the control mapping machine is configured to map the control to the second function while the first external hardware accessory is removably affixed to the game controller, and wherein the control mapping machine is configured to map the control to a third function, different than the second function, while a second, different external hardware accessory is removably affixed to the game controller.

7. The game controller of claim 5, wherein the control mapping machine is configured to selectively change mappings of different ones of the plurality of controls based on which of the plurality of differently configured external hardware accessories is removably affixed to the game controller.

8. A method for controlling operation of a game controller in communication with a computing device, the method comprising:
   recognizing that no external hardware accessory is affixed to the game controller;
   mapping a control of the game controller to a first function while no external hardware accessory is affixed to the game controller;
   sending the first function from the game controller to the computing device based on the control being activated via user manipulation;
   recognizing that an external hardware accessory is removably affixed to the game controller, wherein the external hardware accessory includes an additional control;
   mapping the control to a second function different than the first function based on recognizing that the external hardware accessory is removably affixed to the game controller; and
   sending the second function from the game controller to the computing device based on the control being activated via user manipulation and based on a signal received from the external hardware accessory responsive to user manipulation of the additional control while the external hardware accessory is removably affixed to the game controller.

9. The method of claim 8, further comprising:
   toggling between two or more different mappings responsive to a toggling of the additional control of the external hardware accessory.

10. The method of claim 8, further comprising:
    sending to the external hardware accessory a feedback signal useable by the external hardware accessory to provide sensory feedback that the second function is being performed.

11. The method of claim 8, wherein an accessory interface of the game controller is configured to interchangeably affix a plurality of differently configured external hardware accessories to the game controller.

12. The method of claim 11, further comprising:
    mapping the control to a first-external-accessory function based on recognizing that a first external hardware accessory is removably affixed to the game controller, and mapping the control to a second-external-accessory function, different than the first-external-accessory function, based on recognizing that a second, different external hardware accessory is removably affixed to the game controller.

13. The method of claim 8, wherein mapping the control to the second function is based on both the control and the additional control being activated at a same time while the external hardware accessory is removably affixed to the game controller.

14. A game controller in communication with a computing device, the game controller comprising:
    a plurality of controls;
    an accessory interface configured to removably affix an external hardware accessory to the game controller, the external hardware accessory including an additional control; and
    a control mapping machine configured to:

map a control of the plurality of controls to a first function while the external hardware accessory is not affixed to the game controller, send the first function from the game controller to the computing device based on the control being activated via user manipulation, while the external hardware accessory is not affixed to the game controller, map the control to a second function different than the first function based on the game controller detecting that the external hardware accessory is removably affixed to the game controller, send the second function from the game controller to the computing device based on the control being activated via user manipulation, while the external hardware accessory is removably affixed to the game controller; and send a third function from the game controller to the computing device based on the additional control of the external hardware accessory being activated via user manipulation while the external hardware accessory is removably affixed to the game controller.

15. The game controller of claim 14, wherein the control mapping machine is configured to map the control to the third function based on both the control and the additional control being activated at a same time while the external hardware accessory is removably affixed to the game controller.

16. The game controller of claim 14, wherein the third function is a function to which none of the plurality of controls is mapped while the external hardware accessory is removably affixed to the game controller.

* * * * *